US008701936B2

(12) United States Patent
Thomas et al.

(10) Patent No.: US 8,701,936 B2
(45) Date of Patent: Apr. 22, 2014

(54) SOLID CONCENTRATE DISPENSING SYSTEM

(75) Inventors: John E. Thomas, River Falls, WI (US); Gregory G. Griese, Hudson, WI (US)

(73) Assignee: Ecolab USA Inc., St. Paul, MN (US)

( * ) Notice: Subject to any disclaimer, the term of this patent is extended or adjusted under 35 U.S.C. 154(b) by 87 days.

(21) Appl. No.: 13/328,664

(22) Filed: Dec. 16, 2011

(65) Prior Publication Data

US 2013/0153602 A1 Jun. 20, 2013

(51) Int. Cl.
*B67D 7/74* (2010.01)
*B67D 7/70* (2010.01)
*B01D 11/04* (2006.01)
*B01D 11/02* (2006.01)

(52) U.S. Cl.
USPC ........ 222/129; 222/136; 222/321.7; 422/258; 422/261

(58) Field of Classification Search
USPC ................ 222/129, 321.7, 321.1, 136, 321.9, 222/153.14, 153.13, 153.04; 239/306, 307, 239/308; 422/258, 261, 266
See application file for complete search history.

(56) References Cited

U.S. PATENT DOCUMENTS 5,342,587 A * 8/1994 Laughlin et al. .............. 422/266
5,890,624 A 4/1999 Klima et al.
5,964,377 A 10/1999 Demarest et al.
6,041,969 A * 3/2000 Parise ........................... 222/129
7,118,012 B2 * 10/2006 Butler ........................... 222/129
8,157,131 B2 * 4/2012 Sim ............................... 222/129
2005/0284959 A1 12/2005 Hubmann et al.
2009/0277928 A1 11/2009 Brückner
2010/0084368 A1 4/2010 Sim
2010/0090027 A1 4/2010 Knopow et al.

FOREIGN PATENT DOCUMENTS

KR 10-2011-0031131 A 3/2011
WO 03011474 A1 2/2003
WO 2006102481 A2 9/2006
WO 2006102481 A3 9/2006
WO 2008154354 A1 12/2008

OTHER PUBLICATIONS

International Search Report and Written Opinion for corresponding international application No. PCT/US2012/069481, dated Apr. 1, 2013, 13 pp.

* cited by examiner

*Primary Examiner* — Kevin P Shaver
*Assistant Examiner* — Stephanie E Williams
(74) *Attorney, Agent, or Firm* — Shumaker & Sieffert, P.A.

(57) ABSTRACT

Dispensing systems facilitates formation and dispensation of a use solution from a solid concentrate. The dispensing system may include a cartridge attached to a spray bottle or other dispensing apparatus. The cartridge defines a reservoir configured to store a solid product concentrate. A diluent, such as water, is placed in a fluid reservoir of the dispensing apparatus. Activation of a dispensing mechanism, such as a trigger, creates a vacuum in the cartridge reservoir, opening a valve and drawing diluent from the fluid reservoir into the cartridge reservoir and onto the solid product. The flow of diluent onto the solid product causes a portion of the solid product to be dissolved, eroded, and/or otherwise mixed with the diluent to form a use solution. Actuation of the dispense mechanism may further draw the use solution from the cartridge reservoir and dispense the use solution through the nozzle.

19 Claims, 3 Drawing Sheets

SOLID CONCENTRATE DISPENSING SYSTEM

TECHNICAL FIELD

The disclosure relates generally to chemical product dispensing.

BACKGROUND

Cleaning products, such as detergents, disinfectants, or other cleaning solutions, are widely used in many industries. In some cases, the products are packaged in a highly concentrated form in which some or substantially all of the water has been removed. These concentrated products may permit more efficient transport and storage as compared to their ready-to-use counterparts. The concentrated products may be manually or automatically diluted and dispensed as desired by an end user.

SUMMARY

In general, the disclosure is directed to systems for formation and dispensing of a use solution from a solid concentrate. The solid concentrate may include, for example, a solid chemical product concentrate.

In one example, the disclosure is directed to a system comprising a fluid pump including a nozzle, a trigger, and a fluid tube having a proximal end in fluid communication with the nozzle, a bottle defining a first reservoir configured to store a diluent, and a cartridge coupled to the bottle, the cartridge comprising a housing defining a second reservoir configured to store a solid concentrate, and a valve positioned within a surface of the housing, wherein the surface of the housing is positioned between the first reservoir and the second reservoir when the cartridge is coupled to the bottle, the valve further configured to open upon actuation of the trigger and allow flow of the diluent from the first reservoir to the second reservoir to at least partially dissolve or erode the solid concentrate and form a use solution in the second reservoir, wherein upon actuation of the trigger the use solution is drawn from the second reservoir into a distal end of the fluid tube and delivered to the nozzle. The cartridge may be removably coupled to the bottle. The solid concentrate may include at least one of a detergent, a disinfectant, a sanitizer, a degreaser, or a bleach.

In another example, the disclosure is directed to a cartridge comprising a housing defining a reservoir, a valve positioned within a surface of the housing, and a solid concentrate positioned within the reservoir, wherein the valve is configured, in response to actuation of a dispense mechanism, to allow one-way flow of a diluent into the reservoir to at least partially dissolve the solid concentrate and form a use solution in the reservoir. The solid concentrate may include at least one of a detergent, a disinfectant, a sanitizer, a degreaser, or a bleach. The cartridge may further comprise a platform configured to support the solid concentrate. The cartridge may further comprise a diffuser configured to spread the flow of diluent from the valve into a relatively wider cross-sectional area.

In another example, the disclosure is directed to a system comprising a dispense mechanism that when actuated dispenses a use solution, a container defining a first reservoir configured to store a diluent, and a cartridge coupled to the container, the cartridge comprising a housing defining a reservoir configured to store a solid product concentrate, and a valve positioned within a surface of the housing, the valve configured, in response to actuation of the dispense mechanism, to allow one-way flow of diluent from the container into the reservoir to at least partially dissolve the solid product concentrate and form the use solution in the reservoir.

The details of one or more examples are set forth in the accompanying drawings and the description below. Other features and advantages of the disclosure will be apparent from the description and drawings, and from the claims.

DETAILED DESCRIPTION

Dispensing system(s) as described herein facilitate formation and dispensation of a use solution from a solid chemical product concentrate. The dispensing system may include a cartridge attached to a spray bottle or other dispensing apparatus. The cartridge defines a reservoir configured to store a solid product concentrate. A diluent, such as water, is placed in a fluid reservoir of the dispensing apparatus. Activation of a dispensing mechanism, such as a trigger, creates a vacuum in the cartridge reservoir, opening a valve and drawing diluent from the fluid reservoir into the cartridge reservoir and onto the solid product. The flow of diluent onto the solid product causes a portion of the solid product to be dissolved, eroded, and/or otherwise mixed with the diluent to form a use solution. Actuation of the dispense mechanism may further draw the use solution from the cartridge reservoir and dispense the use solution through the nozzle.

The systems described herein may provide one or more advantages. For example, the system may permit a solid product concentrate to be dispensed from a spray bottle or other dispensing apparatus. The dispensing apparatus may be refilled with water or other diluent several times before the solid product concentrate needs to be changed.

Figure 1A:
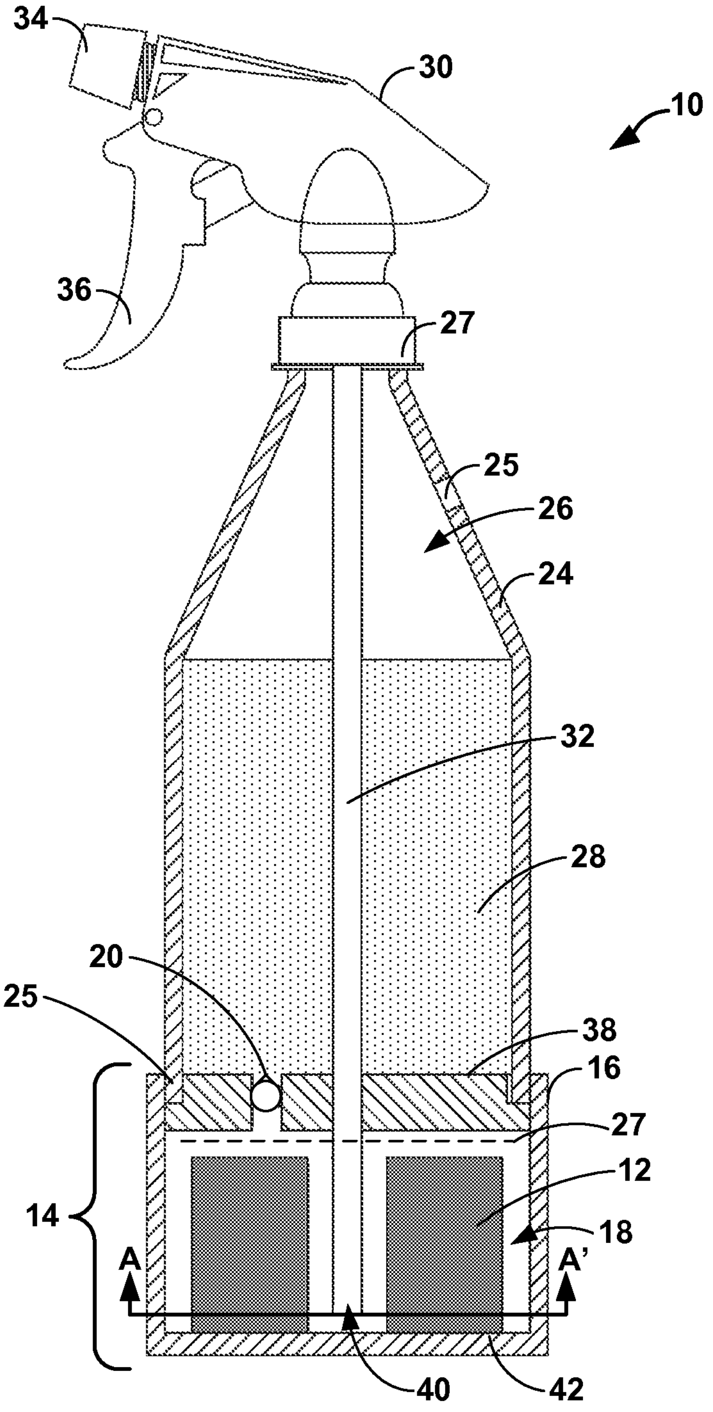
FIG. 1A is a schematic diagram of an example dispensing system that forms and dispenses a use solution from a solid concentrate.
Figure 1B:
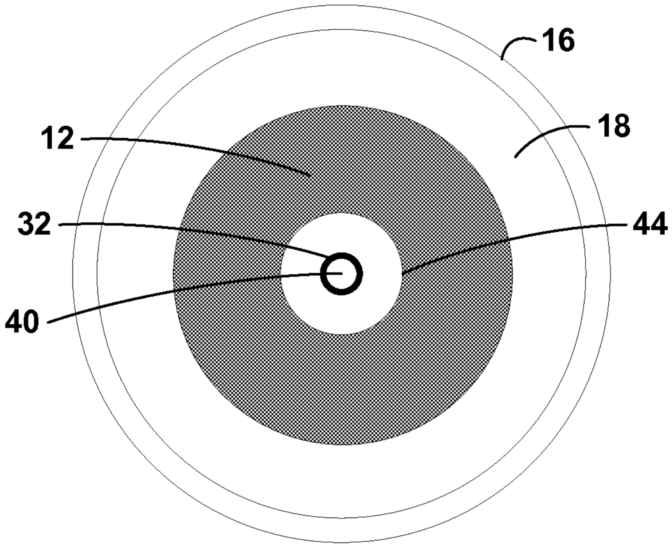
FIG. 1B is a cross-sectional view of the example dispensing system of FIG. 1A taken along the line A-A'.

FIG. 1A illustrates an example dispensing system 10 that forms and dispenses a use solution from a solid concentrate 12. FIG. 1B is a cross-sectional view of the dispensing system 10 of FIG. 1A taken along the line A-A'. Example system 10 includes a dispensing apparatus 24 (in this case a spray bottle) physically coupled to a removable cartridge 14. It shall be understood that dispensing apparatus other than spray bottles could also be used, and that the disclosure is not limited in this respect. Cartridge 14 is formed by a housing 16 defining a cartridge reservoir 18, into which a solid product concentrate 12 may be placed. Cartridge 14 may also includes a valve 20 positioned at a top end of housing 16.

Spray bottle 24 defines a fluid reservoir 26 configured to store a diluent 28. System 10 further includes a dispensing mechanism 30 including a fluid tube 32, a nozzle 34, and a trigger 36. In some examples, nozzle 34 may be adjustable so as to select between dispensing use solution in a stream, an aerosolizing mist, or a spray. In this example, dispensing mechanism 30 acts as a positive displacement pump. Actuation of trigger 36 draws use solution contained in the cartridge reservoir 18 up through fluid tube 32 and forces the use solution through nozzle 34. In other examples, the dispensing apparatus may include a spray can, a bulb dispenser, a pump dispenser, or any other type of manual or automated pump or dispense mechanism. It shall be understood, therefore, that dispensing mechanism may be any appropriate mechanism for dispensing a fluid, and that the disclosure is not limited in this respect.

In some examples, solid product concentrate 12 may be a solid block of a chemical product concentrate that includes one or more active ingredient(s) that when diluted form a use solution. The use solution may be, for example, a cleaning product. Valve 20 allows one-way flow of diluent 28 from dispensing apparatus 24 into reservoir 18 to dissolve or erode a portion of solid concentrate 12, thus creating a use solution in the reservoir 18. In this example, valve 20 may be configured such that actuation of trigger 36 creates a partial vacuum within reservoir 18 (e.g., by removing air or liquid from reservoir 18 via fluid tube 32), which causes valve 20 to open and allow some of diluent 28 to enter reservoir 18. Flow of diluent 28 onto solid concentrate 12 erodes or dissolves a portion of solid concentrate 12, thus creating a use solution in cartridge reservoir 18. This same actuation of trigger 30 results in dispensing of the use solution through nozzle 34.

The solid concentrate 12 may take the form of a unitary solid block of chemical product concentrate. Such a block may take a wide variety of shapes. For example, solid concentrate 12 may be toroidal or donut-shaped, as shown in FIG. 1B. In this example, toroid shaped solid concentrate 12 defines an aperture 44. A distal end 40 of fluid tube 32 is positioned within the aperture 44. However, it shall be understood that solid concentrate 12 may take other unitary solid shapes, and that the disclosure is not limited in this respect. Alternatively, solid concentrate 12 may also be formed as a plurality of pellets or tablets of various sizes or shapes. The solid product may be cast, extruded, or otherwise formed to its final shape. It is to be understood, therefore, that the size and shape of solid concentrate 12 is not a limiting feature of the disclosure, and that many differently shaped or sized solid concentrates may be used.

Solid concentrate 12 may include any of a wide variety of active ingredients. For example, the active ingredient(s) may include one or more cleaning ingredients, such as one or more of a detergent, a disinfectant, a sanitizer, a degreaser, a bleach, or other cleaning ingredient(s). In those examples, solid concentrate 12 may be diluted to form a detergent solution, disinfectant solution, a sanitizing solution, a degreaser solution, a bleach solution, etc. However, it shall be understood that solid concentrate 12 need not include cleaning ingredients, and that solid concentrate 12 may include any other form of active ingredient(s) to be dispensed, and that the disclosure is not limited in this respect.

Diluent 28 may be any liquid suitable for diluting solid concentrate 12. For example, diluent 28 may include one or more inactive ingredient(s) that when mixed with the solid concentrate forms a use solution. Water is one example of a suitable diluent. In other examples, diluent 28 may include water and one or more active ingredient(s) that when mixed with the active ingredient(s) of solid product concentrate 12 form a use solution. Other examples of suitable diluent 28 may include electrolyzed water or other electrochemically activated water solution.

In some examples, reservoir 26 may be refilled with diluent 28 multiple times before solid concentrate 12 is completely dissolved/eroded and requires replacement. To that end, spray bottle 24 (or other dispensing apparatus) may include a port 25 through which dispensing apparatus 24 may be filled or refilled with diluent 28. Port 25 facilitates refill of diluent 28 without requiring removal of spray head 30 or of cartridge 14. Port 25 may be any suitable mechanism for receiving diluent into reservoir 26. For example, port 25 may be an aperture defined by dispensing apparatus 24, a valve, a spout, or other means of entry into reservoir 26. Port 25 may be configured to accept a dispensing mechanism, such as a syringe, straw, hose, or other type of tube, through which diluent 28 may be dispensed into the fluid reservoir 26. Port 25 may also include a valve or connector through which any such dispensing mechanism may physically connect with spray bottle 24. Port 25 may include a cap, plug, cover, etc. to close off the aperture when diluent 28 is not being injected into reservoir 26. As another example, port 25 may include a valve that is configured to mate with a dispensing mechanism and allow diluent 28 to enter reservoir 26.

Additionally or alternatively, dispensing mechanism 30 may be removed from bottle 24 to refill reservoir 26 with diluent. For example, dispensing mechanism 30 may include a coupling mechanism 27 with threads configured to mate with corresponding threads on bottle 24. In other examples, coupling mechanism 27 may include a snap fit or other fitting configured to couple dispensing mechanism 30 and reservoir 26.

Valve 20 may be any type of valve that facilitates one-way flow of diluent 28 from reservoir 26 into reservoir 18 in response to a reduction in pressure within reservoir 18. For example, valve 20 may include a ball check valve, a diaphragm check valve, a swing check valve, a stop-check valve, a lift-check valve, a duckbill check valve, or other one-way valve.

Although in FIG. 1A system 10 is shown with one valve 20, in some examples system 10 may include a plurality valves between the fluid reservoir 26 and the cartridge reservoir 18. In some examples, the plurality of valves may be relatively evenly spaced across the boundary between reservoir 26 and cartridge reservoir 18 such that diluent 28 flows through the plurality of valves 20 and contacts solid concentrate 12 at a plurality of locations. Thus, a cartridge 14 that includes a plurality of valves 20 may allow solid concentrate 12 to be more evenly eroded by diluent 28. In some examples, the plurality of valves 20 may comprise a variety of different types of one-way valves.

In other examples, system 10 may include a diffuser (indicated generally by reference numeral 27) or other device that diffuses or spreads out the flow of diluent onto the solid concentrate 12. Diffuser 27 may include, for example, a plate or sheet of material having a plurality of perforations, slots, or louvers through which a single stream of diluent may be spread out over a relatively wider cross-sectional area. Diffuser 27 may also include a nozzle that converts a single stream from a valve, such as valve 20, to a spray that covers a wider cross-sectional area, or a nozzle that is shaped to produce a stream having a particular shape.

In some examples, cartridge 14 may be removably coupled to dispensing apparatus 24. For example, cartridge 14 and/or dispensing mechanism 24 may include a removable coupling mechanism, indicated generally by reference numeral 25 in FIG. 1A. For example, coupling mechanism 25 may include a screw-type connection in which cartridge housing 16 includes a threading mechanism configured to mate with corresponding threads on dispensing apparatus 24. As another example, the coupling mechanism 25 may include a snap-type connector, a quick-connect fitting, a bayonet connector, or other type of removable coupling mechanism.

A removable cartridge 14 may permit cartridge 14 to be refilled when necessary or desired. For example, when solid concentrate 12 has been substantially or mostly completely dissolved or eroded, a user may remove cartridge 14 and replace the spent solid concentrate by placing a new solid concentrate 12 into reservoir 18. As another example, a user may wish to replace one type of solid concentrate with another type of solid concentrate having a different active ingredient or form factor. In some examples, in order to allow access to reservoir 18 for replacement of solid concentrate 12, at least a portion of side 38 of housing 16 may be removable from housing 16. For example, housing 16 may include a coupling mechanism between side 38 and other surfaces of housing 16 such that at least a portion of side 38 can be decoupled from the housing 16 to expose reservoir 18. In other examples, cartridge 14 may be disposable. For example, upon substantially or mostly complete dissolution or erosion of solid concentrate 12, cartridge 14 may be decoupled from dispensing apparatus 24 and disposed of. The spent cartridge may then be replaced with a new cartridge 14 having a new supply of solid concentrate 12.

In some cases, removable cartridge 14 may facilitate the use of various types of solid concentrate 12 with a single dispensing apparatus 24. For example, a user may refill or replace a removable cartridge 14 with a solid concentrate having one or more different active ingredients than did a the solid concentrate contained in a previous cartridge. As another example, a user may refill or replace a removable cartridge 14 with a solid concentrate having a different form factor than did a previous solid concentrate (e.g., a unitary solid block versus tablets or pellets). Similarly, if system 10 includes a disposable cartridge 14, the cartridge 14 may be replaced with a new cartridge 14 that includes a different type of solid concentrate 12 than was previously used. Thus, removable cartridge 14 may also allow for versatility in the types of products dispensed by system 10.

Figure 2:
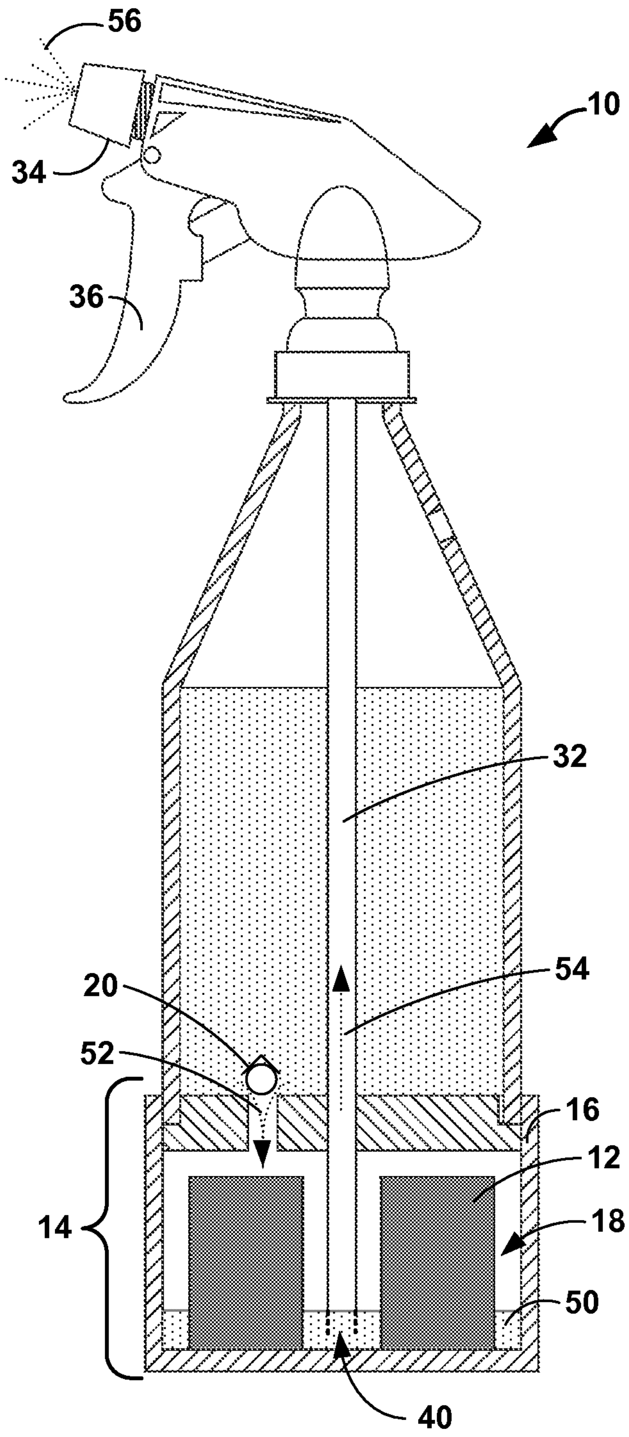
FIG. 2 is a schematic diagram illustrating operation of the example dispensing system.

FIG. 2 is a schematic diagram illustrating operation of the example system 10. When a user applies a force to trigger 36, fluid is drawn from reservoir 18 through fluid tube 32, resulting in a reduction in pressure within reservoir 18. Initially, if there is no liquid in the bottom of reservoir 18 when trigger 36 is pulled, air is drawn from reservoir 18 through fluid tube 32, which reduces the pressure within reservoir 18 causing check valve 20 to open, thus allowing an amount of diluent 28 enter reservoir 18 as indicated by arrow 52. The diluent flowing into reservoir 18 contacts the solid concentrate 12 and erodes or dissolves some of solid concentrate 12, forming a use solution 50. Further actuation of trigger 36 draws the use solution up through tube 32 as indicated by arrow 54 and forces the use solution out of nozzle 34 as indicated by reference numeral 56, while at the same time allowing additional diluent to enter reservoir 18 through valve 20 and create more use solution.

The amount of diluent 28 that flows into reservoir 18 through valve 20 is generally directly proportional to the amount of air or use solution removed from reservoir 18. That is, valve 20 remains open until the pressure within reservoir 18 returns to the pressure that was present before actuation of dispense mechanism 30. After the system 10 is “primed” the amount of use solution 50 within reservoir 18 may remain substantially constant.

Figure 3:
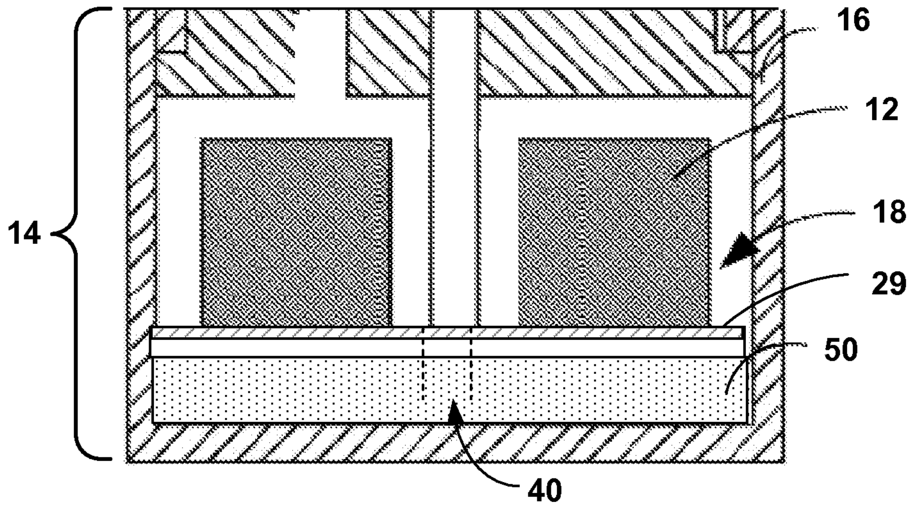
FIG. 3 is a schematic diagram of another example cartridge for use with the dispensing system described herein.

Any use solution or diluent in contact with solid product concentrate 12 within reservoir 18 may continue to dissolve and/or erode solid concentrate 12. In some examples, cartridge 14 may include a platform, such as platform 29 shown in FIG. 3. In this example, platform 29 is positioned above bottom surface 42 of housing 16. In general, platform 29 may be configured and positioned such that the solid concentrate 12 does not contact the bottom surface 42 of the housing 16, or such that contact between solid concentrate 12 and any use solution or diluent present in reservoir 18 is minimized. Platform 29 may be formed from any suitable material, size, shape, or configuration to place solid concentrate 12 at a suitable height or position within reservoir 18. Platform 29 may include a screen, perforation or other aperture(s) through which diluent and eroded/dissolved concentrate may enter the lower portion of the reservoir 18. In addition, platform 29 may be coupled to the bottom and/or side surfaces of housing 16 in any suitable manner, e.g., via an adhesive, mechanical fitting, etc. In some examples, the platform may be formed as part of housing 16. For example, housing 16 may be molded to include a platform or one or more raised portions protruding from bottom surface 42 into reservoir 18 or extending from one side of housing 16 to another side of housing 16.

Various examples have been described. These and other examples are within the scope of the following claims.

The invention claimed is:

1. A system comprising:

a fluid pump including a nozzle, a trigger, and a fluid tube having a proximal end in fluid communication with the nozzle;

a bottle defining a first reservoir configured to store a diluent; and a cartridge coupled to the bottle, the cartridge comprising:

a housing defining a second reservoir configured to store a solid chemical product concentrate that includes one or more active ingredient(s) that when diluted form a use solution; and a valve positioned within a surface of the housing, wherein the surface of the housing is positioned between the first reservoir and the second reservoir when the cartridge is coupled to the bottle, the valve further configured to open upon actuation of the trigger and allow flow of the diluent from the first reservoir to the second reservoir to at least partially dissolve or erode the solid chemical product concentrate and form the use solution comprised of the diluent and the dissolved or eroded solid chemical product concentrate in the second reservoir;

wherein upon actuation of the trigger the use solution is drawn from the second reservoir into a distal end of the fluid tube and delivered to the nozzle.

2. The system of claim 1 wherein the valve is a one-way valve configured to permit flow of the diluent from the first reservoir to the second reservoir.

3. The system of claim 1 wherein the cartridge is removably coupled to the bottle.

4. The system of claim 1 further comprising a coupling mechanism configured to removably connect the cartridge and the bottle.

5. The system of claim 4 wherein the coupling mechanism comprises at least one of a threading mechanism, a snap mechanism, a quick-connect fitting, or a bayonet connector.

6. The system of claim 1 further comprising a platform configured to support the solid chemical product concentrate positioned within the cartridge reservoir.

7. The system of claim 1 wherein the solid chemical product concentrate comprises at least one of a detergent, a disinfectant, a sanitizer, a degreaser, or a bleach.

8. The system of claim 1 wherein the diluent comprises one of water or electrolyzed water.

9. The system of claim 1 wherein the use solution comprises at least one of a detergent solution, a disinfectant solution, a sanitizing solution, a degreasing solution, or a bleach solution.

10. A cartridge comprising:

a housing defining a reservoir;

a valve positioned within a surface of the housing; and a solid chemical product concentrate positioned within the reservoir, wherein the valve is configured, in response to actuation of a dispense mechanism, to allow one-way flow of a diluent into the reservoir to at least partially dissolve the solid chemical product concentrate and form a use solution comprised of the diluent and the dissolved or eroded solid chemical product concentrate in the reservoir, wherein the surface of the housing comprises a top surface of the housing, and wherein the housing further comprises:

a bottom surface configured to support the solid chemical product concentrate; and a diffuser positioned between the bottom surface and the top surface, the diffuser configured to spread the one-way flow of the aqueous diluent from the valve into a relatively wider cross-sectional area and onto the solid chemical product concentrate.

11. The system of claim 10 wherein the solid chemical product concentrate comprises at least one of a detergent, a disinfectant, a sanitizer, a degreaser, or a bleach.

12. The cartridge of claim 10 further comprising a coupling mechanism configured to couple the housing to a dispensing apparatus including a container for storing the diluent.

13. The cartridge of claim 12 wherein the coupling mechanism comprises at least one of a screw thread mechanism or a snap mechanism.

14. The cartridge of claim 10 wherein the surface of the housing comprises a top surface of the housing, and wherein the housing further comprises:

a bottom surface; and a platform positioned between the bottom surface and the top surface, the platform configured to support the solid chemical product concentrate.

15. A system comprising:

a dispense mechanism that when actuated dispenses a use solution;

a container defining a first reservoir configured to store a diluent; and a cartridge coupled to the container, the cartridge comprising:

a housing defining a reservoir configured to store a solid chemical product concentrate; and a valve positioned within a surface of the housing, the valve configured, in response to actuation of the dispense mechanism, to allow one-way flow of diluent from the container into the reservoir to at least partially dissolve the solid chemical product concentrate and form the use solution in the reservoir, wherein the use solution is comprised of the diluent and the dissolved or eroded solid chemical product concentrate.

16. The system of claim 15 wherein the cartridge is removably coupled to the bottle.

17. The system of claim 15 wherein the use solution comprises at least one of a detergent solution, a disinfectant solution, a sanitizing solution, a degreasing solution, or a bleach solution.

18. The system of claim 15 wherein the surface of the housing comprises a top surface of the housing, and wherein the housing further comprises:

a bottom surface; and a platform positioned between the bottom surface and the top surface, the platform configured to support the solid chemical product concentrate.

19. The system of claim 15, wherein the surface of the housing comprises a top surface of the housing, and wherein the housing further comprises:

a bottom surface configured to support the solid chemical product concentrate; and a diffuser positioned between the bottom surface and the top surface, the diffuser configured to spread the one-way flow of the aqueous diluent from the valve into a relatively wider cross-sectional area and onto the solid chemical product concentrate.

* * * * *